May 12, 1925. 1,537,549
A. RAFFAY
SLEEVE CONTRACTOR
Filed June 11, 1923
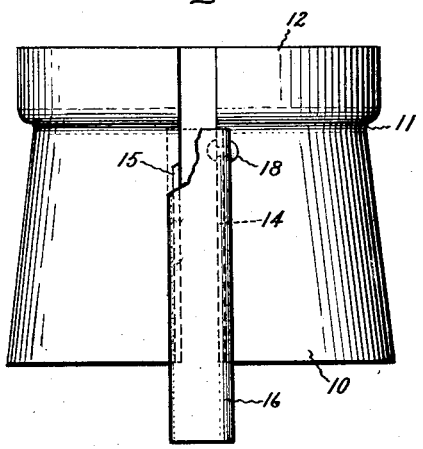
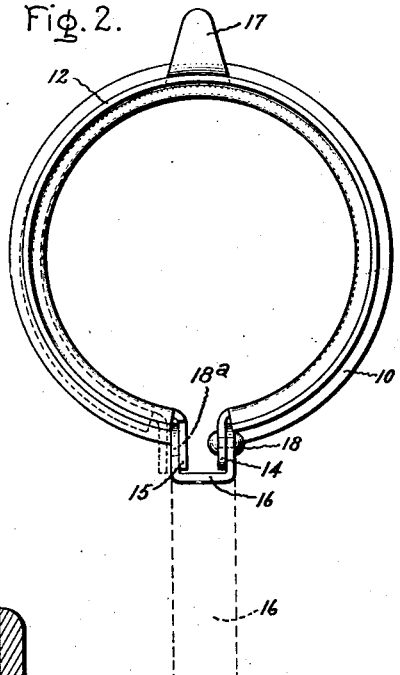
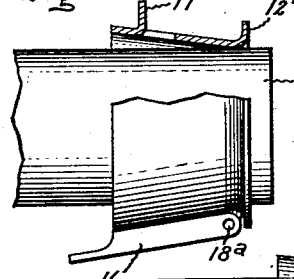
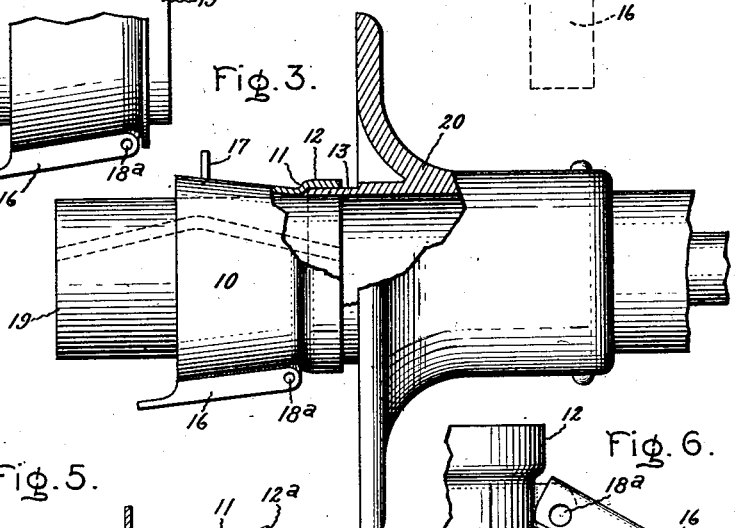
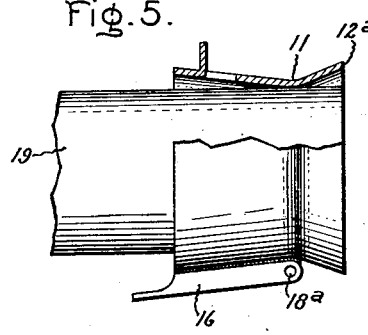
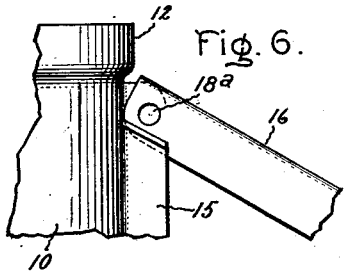
Inventor:
Andrew Raffay.
by Robert B. Meckley
His Attorney.

Patented May 12, 1925.

1,537,549

UNITED STATES PATENT OFFICE.

ANDREW RAFFAY, OF SCHENECTADY, NEW YORK.

SLEEVE CONTRACTOR.

Application filed June 11, 1923. Serial No. 644,651.

*To all whom it may concern:*

Be it known that I, ANDREW RAFFAY, a citizen of the United States, residing at Schenectady, in the county of Schenectady, State of New York, have invented certain new and useful Improvements in Sleeve Contractors, of which the following is a specification.

One of the objects of my invention is to provide an improved sleeve contractor which shall be simple and rugged in construction, reliable in operation, and cheap to manufacture.

The invention is particularly applicable to the contraction of a split roller bearing bushing or sleeve preparatory to insertion in the rear shaft housing of an automobile, such for example as the Ford car. The insertion of these bushings or sleeves is difficult because of the fact that the split sleeves have a certain resiliency, and when in their normal positions they are slightly larger than the opening in the rear shaft housing of the automobile, so that it is very difficult to hold the sleeve in the contracted position and at the same time insert the sleeve in the housing.

A further object of the invention is to provide an improved bushing or sleeve contractor which shall have a comparatively few simple and easily manufactured parts which may be readily assembled into a complete device.

For a better understanding of the invention, reference is had to the accompanying drawings, wherein Fig. 1 is a plan view of the present preferred form of my sleeve contractor, Fig. 2 is an end view of the same, and Fig. 3 is a view of the sleeve contractor in the locked position with the split roller bearing sleeve held therein, with the sleeve partially inserted in the rear axle housing of an automobile. Certain of the parts are shown in section and certain are broken away in order to show the operation of the invention. Figs. 4 and 5 show modified forms of the sleeve contractor, and Fig. 6 is a detail showing the relative positions of the parts of Figs. 1 and 2 when the locking member is in the open position and the split resilient band is in the expanded position.

Referring particularly to Figs. 1, 2, 3 and 6, the sleeve contractor comprises a unitary split resilient band 10, which is preferably a stamping from sheet metal, formed into the shape shown. This band is frustro-conical in shape throughout its major portion with the small diameter section 11 intermediate the extremities of the band. The other portion 12, or rim of the band, is of substantially uniform diameter throughout, and is of such a diameter as to be slightly larger than the roller bearing sleeve when in the contracted position, so that this portion of the band may slip over the rim 13 of the rear axle housing, as shown in Fig. 3. The ends of the band 14 and 15 are bent so as to form projections which project radially from the periphery of the band, and the locking member 16 is hingedly connected to the end 14 near the reduced diameter section 11 of the band. This locking member is arranged to be moved radially of the band into and out of locking relation with respect to the ends 14 and 15.

The locking member is preferably of channel section, as shown, so that the interior surfaces of the flanges thereof will make engagement with the respective exterior surfaces of the projecting ends 14 and 15 so as to hold the band in contracted position. A kicked-up projection 17 is provided for moving the band with respect to the split roller bearing sleeve and also for the purpose of moving the roller bearing sleeve with the contractor in position to insert the sleeve within the rear axle housing. The locking member 16 is shown in the locking position in Figs. 1 and 3, and in Fig. 2 I have indicated in dotted lines the respective positions which the locking member and the band assume when the band is in the expanded position. In Fig. 6, the respective positions of these parts is also clearly shown.

The major portion of the band 10 is frustro-conical in shape with the reduced diameter portion intermediate the extremities of the band, since by such a construction the insertion of the roller bearing sleeve within the band is effected very easily, and the reduced diameter section forms the principal contact surface, so that there is a comparatively small surface used for the application of pressure to contract the sleeve. The arrangement also has the advantage that by reason of the fact that there is a comparatively small area of contact between the band and the sleeve, the withdrawal of the band from the sleeve after the sleeve has been inserted in the rear axle housing and the locking member opened is very easily effected.

It will be observed that the principal parts of the device may be stamped or otherwise formed out of sheet metal in their proper forms, and that to assemble the device it is merely necessary to insert the small rivet 18 through a suitable aperture in the end 14 of the band and one of the flanges of the locking member, and then upset the rivet slightly. The tool for upsetting the rivet may be inserted through the aperture 18$^a$ in the other flange of the locking member. The device thus lends itself very readily to large scale manufacture, since there is a minimum of parts, and these parts are individually of very simple form. It will also be observed that the assembly of the device is very simple because of the fact that it is merely necessary to insert the rivet 18 and upset one end of the rivet slightly.

The device is in itself so simple that the operation thereof will be readily apparent to those skilled in the art. The locking member 16 is moved radially with respect to the band about its pivot 18, so that the ends 14 and 15 of the band are forcibly drawn within and embraced by the locking member with the interior surfaces of the flanges of the locking member in engagement with the respective exterior surfaces of the projecting ends. It will be apparent that to insert the split roller bearing sleeve 19 within the rear axle housing 20 of the automobile, it is merely necessary to slightly compress the sleeve manually and then insert the same within the sleeve contractor with the locking member 16 in the contracted position. The sleeve will readily fit within the bell-shaped mouth of the sleeve contractor when the contractor is in the contracted position and may be readily inserted within the contractor until the sleeve has passed a short distance within the reduced diameter section 11. The locking member 16 may then be moved radially with respect to the band about its pivot 18, so that the ends 14 and 15 of the band 10 are forcibly drawn within and embraced by the locking member with the interior surfaces of the flanges of the locking member in engagement with the respective exterior surfaces of the projecting ends. The sleeve may then be easily pushed further in the contractor until the one edge of the sleeve and the edge of the rim 12 of the contractor are in alignment. One way in which this may be done very easily is to place the roller bearing sleeve with the contractor in locking position thereon on the floor with the rim 12 of the contractor resting on the floor. By stepping on the sleeve 19, the one edge of the sleeve and the edge of the rim 12 will be brought into proper alignment.

The sleeve is then inserted within the rear axle housing, the rim 12 of the contractor slipping over the rim 13 of the axle housing. When this has been done, the sleeve will be held in the contracted position by the rear axle housing, and the contractor 10 may be very readily withdrawn by moving the locking member 16 outwardly so that it disengages the projecting ends 14 and 15. The sleeve 19 may then be forced in the rear axle housing, so that the outer edge of the rim is in alignment with the outer edge of the rim 13 of the axle housing in any suitable manner. It will be observed that the locking member is arranged in such a manner that the unlocking thereof is not interfered with in any way by the rear axle housing.

The arrangement of Fig. 4 is essentially the same as the arrangement which I have previously described in connection with Figs. 1, 2 and 3. In this case, however, the rim 12′ is bent outwardly so as to form a stop to limit the movement of the sleeve and contractor with respect to the rear axle housing. With this arrangement, it will be preferable to mount the contractor in position on the roller bearing sleeve, so that the one end of the sleeve projects slightly from the reduced diameter portion of the band 10, in order to insert the end of the sleeve readily within the rear axle housing.

In Fig. 5 I have shown another modification of the invention, which has certain advantages by reason of the ease of manufacture of the band. In this case the rim 12$^a$ and the major portion of the frustro-conical shape may be formed by a suitable die or otherwise forming the metal of the band to form the reduced diameter section 11. Otherwise the arrangement is essentially the same as that of Figs. 1, 2 and 3, and the operation of this modification will be essentially the same as that of the present preferred form of the invention.

In accordance with the provisions of the patent statutes, I have described the principle of operation of my invention, together with the apparatus which I now consider to represent the best embodiment thereof, and I desire to have it understood that the apparatus shown is only illustrative and that the invention can be carried out by other means.

What I claim as new and desire to secure by Letters Patent of the United States, is:

1. A sleeve contractor comprising a split resilient band having an end projecting radially from the periphery thereof, and a locking member hingedly connected with the other end of said band and having a flange the interior surface of which makes engagement with the outer surface of said projecting end for holding the band in contracted position.

2. A sleeve contractor comprising a split resilient band frustro-conical in shape throughout its major portion, a projection on the periphery of said band, and a locking member hingedly connected to the other end of said band near the small diameter section thereof and cooperating with the said projection for holding the band in contracted position.

3. A sleeve contractor comprising a split resilient band frustro-conical in shape throughout its major portion, a radially projecting end of said band, and a locking member hingedly connected to the other end of said band near the small diameter section of said frustro-conical shaped portion and movable radially of the said band into locking relation with the said radially projecting end.

4. A sleeve contractor comprising a split resilient band having a smaller intermediate diameter and frustro-conical in shape throughout its major portion, an end of said band projecting from the periphery thereof along the said major portion, and a locking member hingedly connected to the other end of said band near the small diameter section and having a flange which makes engagement with the outer surface of the said projecting end for holding the band in contracted position.

5. A sleeve contractor comprising a split unitary resilient band having ends projecting from the periphery thereof along the split, and a channel shaped locking member hinged to one of said ends and arranged to embrace the said projecting ends with the interior surfaces of the flanges of the locking member in engagement with the respective exterior surfaces of the said projecting ends for holding the band in contracted position.

6. A sleeve contractor comprising a split resilient band having an intermediate diameter less than the diameter of the extremities thereof and frustro-conical in shape throughout the major portion thereof, the other portion of said band comprising a rim of substantially uniform diameter and of a diameter larger than the diameter of the contracted sleeve, the ends of said band projecting substantially radially along the split, and a channel-shaped locking member hinged to one of said projecting ends near the small diameter of the band, the said member arranged to substantially embrace the said ends with the interior surfaces of the flanges of said member in engagement with the respective exterior surfaces of the said ends for holding the band in contracted position.

7. As an element of a sleeve contractor, a split resilient band having an intermediate diameter less than the diameter of the extremities thereof, and frustro-conical in shape throughout the major portion thereof, the other portion of said band comprising a rim having a diameter larger than the diameter of the contracted sleeve, the ends of said band projecting substantially radially along the split and providing a portion of a holding means for holding the band in contracted position.

In witness whereof, I have hereunto set my hand this 7th day of June, 1923.

ANDREW RAFFAY.